United States Patent [19]
Holda-Fleck

[11] Patent Number: 5,729,693
[45] Date of Patent: Mar. 17, 1998

[54] SYSTEM AND METHOD TO AUTOMATICALLY PROVIDE AN ELECTRONIC CONSUMER REBATE

[75] Inventor: Marilyn A. Holda-Fleck, Westfield, N.J.

[73] Assignee: Lucent Technologies, Inc., Murray Hill, N.J.

[21] Appl. No.: 781,177

[22] Filed: May 3, 1996

Related U.S. Application Data

[63] Continuation of Ser. No. 174,570, Dec. 28, 1993, abandoned.
[51] Int. Cl.[6] .................................................. G06F 17/60
[52] U.S. Cl. ................................. 395/214; 379/93.12
[58] Field of Search .................................. 395/201, 214, 395/226, 239; 379/90.01, 93.12, 93.13, 88

[56] References Cited

U.S. PATENT DOCUMENTS

| | | |
|---|---|---|
| 4,955,047 | 9/1990 | Morganstein et al. . |
| 5,029,196 | 7/1991 | Morganstein . |
| 5,048,076 | 9/1991 | Maurer et al. . |
| 5,056,019 | 10/1991 | Schulz et al. . |
| 5,109,405 | 4/1992 | Morganstein . |
| 5,202,826 | 4/1993 | McCarthy . |
| 5,222,122 | 6/1993 | Hamilton et al. ................. 379/32 |
| 5,297,194 | 3/1994 | Hunt et al. ...................... 379/88 |
| 5,467,269 | 11/1995 | Flaton ........................... 364/401 |

OTHER PUBLICATIONS

Promo, Mar. 1993, p. 10 "Rebates Are Getting A Bad Rap", ISSN 1047-1707.

*Primary Examiner*—Robert A. Weinhardt

[57] ABSTRACT

A system to automatically provide to a consumer an electronic rebate by an existing telephone network and system. The consumer dials a dedicated preassigned telephone number and is prompted to enter the product code and a serial number for purchase verification purposes. A rebate is provided instantaneously in the form of a credit to the consumer's telephone account. The rebates so provided to consumers are collated on a per manufacturer basis, and the telephone service provider issues statements to the rebating manufacturers to cover the rebates issued as well as its service charge.

14 Claims, 3 Drawing Sheets

SYSTEM AND METHOD TO AUTOMATICALLY PROVIDE AN ELECTRONIC CONSUMER REBATE

This application is a continuation application of U.S. application Ser. No. 08/174,570, filed Dec. 28, 1993 now abandoned.

FIELD OF THE INVENTION

The present invention relates to the consumer rebate industry, and in particular to a system to automatically provide to a consumer an electronic rebate by utilization of an existing public telephone network and system.

BACKGROUND OF THE INVENTION

The consumer rebate is a ubiquitous marketing tool employed by companies selling goods at virtually all price levels. Although rebates for relatively expensive goods such as consumer electronic equipment may be in the range of twenty dollars and up, most consumer rebates are for grocery and domestic items and are in the range of twenty five cents to two or three dollars.

The cost to the manufacturer of processing consumer rebates relative to their cash value to the consumer is problematic. Manufacturers must provide rebate request intake services, must manually check that the rebate request includes the proper coupon, proof-of-purchase and receipt, and must process the check and mail it to the consumer with prepaid postage. Checks for small amounts are often not even cashed by the consumer, which causes accounting problems. Although rebate service clearinghouses exist which can perform these tasks, the costs to the manufacturer still exist and are ultimately absorbed by the consumers.

In addition, the consumer often does not take advantage of the rebate since the time required in obtaining and filling out the coupon, cutting off the package label, and looking for the cash register receipt is simply not worth the effort for the promise of a twenty five or fifty cent check to be received in some four to eight weeks. The consumer may as a result become disenchanted with the goods offered with rebates and opt for goods which are simply less expensive at the point-of-sale. Thus, the positive marketing effect sought by rebate offers is obviated by the cumbersome rebate process itself.

Systems have been proposed in the prior art in an attempt to automate the rebate and coupon industry and relieve some of the aforementioned problems. For example, a system exists which uses a computer system to offer purchase incentives without distributing coupons. In the system, the consumer is issued a customer identification card with an encoded consumer identification code in machine-readable form. A list of products subject to discounts is distributed at the retail store. When a valid identification card is scanned at the check-out terminal, the store computer automatically discounts those items on the list according to stored product files. This system requires the use of specially issued consumer identification cards, and those consumers without such cards cannot participate in the program. Moreover, this system requires merchants to participate in the program and provide a point-of-sale discount rather than a true manufacturer's rebate.

U.S. Pat. No. 5,056,019 to Schultz et al., AUTOMATED PURCHASE REWARD ACCOUNTING SYSTEM AND METHOD, describes a similar marketing method for providing manufacturer reward offers by automatically tracking the purchase of member consumers through the use of bar-coded membership cards and using the purchase records in a data processing system to determine if the required purchases have been made to earn a reward. Members receive a reward booklet listing the available reward offers and a periodic status report to track the consumer's individual purchase progress. A reward certificate is issued or a check is issued after a predetermined number of purchases have ben made. Disadvantageously, the system of Schultz et al. thus requires both consumers and merchants to become members to the system. Thus consumers not part of the system cannot receive rebate credit. Moreover, even those consumers who are members of the system will not be ale to obtain rebate credit at non-participating merchants; their choice of shopping outlets is thus limited by the system itself. In addition, special card reading equipment at the point of sale is required. Moreover, the system does not provide a substantially immediate rebate to the consumer subsequent to the purchase of the products.

U.S. Pat. No. 5,202,826 to McCarthy, CENTRALIZED CONSUMER CASH VALUE ACCUMULATION SYSTEM FOR MULTIPLE MERCHANTS, discloses a centralized system of accumulating credits for consumers based upon point-of-sale transactions with multiple merchants wherein for each transaction, the consumer's preassigned account number is transmitted to the central system along with data identifying the merchant and the credit value for that transaction. The credit value may be selected by the merchant or may be established by the presentment by the consumer of a manufacturer's rebate coupon. An account dedicated for each consumer is revised after each transaction, and at some predetermined time, the consumer is given access to his total credits by either an electronic funds transfer to an existing bank account or by the issuance of a check to the consumer through the mail. The system of McCarthy only partially dispenses with the need for paper processing of rebates, since the consumer without an appropriate bank account will still require the issuance of a check in order to collect his funds. Moreover, the consumer in McCarthy's system must wait until a predetermined time has occurred in order to collect, which may be up to one year from the time the purchase was made. Further, the system of McCarthy requires the merchants to participate, thus preventing the consumer from obtaining rebate credit at a non-participating merchant. Moreover, participating merchants must purchase and install special computers and communications devices adding undesirably to the cost of implementation of the system.

It is therefore an object of the present invention to overcome the problems of the prior art and to provide a system which will allow a consumer of goods to quickly collect a rebate without the necessity of tending to the above-mentioned paperwork.

It is a further object of the present invention to provide such a system which, after initial set-up, will automatically provide a rebate to the consumer without the need for manufacturer intervention on a request-by-request basis.

It is a further object of the present invention to provide such a system which can be implemented within the framework of an existing consumer-accessible platform so as to reduce the cost of implementation and make the system immediately available to all consumers and manufacturers.

It is a still further object of the present invention to provide such a system which does not require intervention or participation by the retail merchant at the point-of-sale, thus allowing the consumer to shop at the merchant of choice and reducing the cost of implementation of the system.

SUMMARY OF THE INVENTION

In accordance with these and other objects, provided is an automated rebate system which can be implemented on an existing public telephone network which is readily available to virtually all consumers. After purchasing the applicable product, the purchaser accesses the rebate system by dialing from his home telephone a phone number provided on or inside the packaging of the purchased product. Upon being connected with the system, the purchaser is instructed by an automatic voice prompt to enter via a touch-tone (DTMF) telephone keypad a product code, which may be the Universal Product Code (UPC) and/or some other code provided by the manufacturer. The system can use the product code to verify that the rebate offer for that product has not expired. The rebate amount is then retrieved from a look-up table by using the product code as an address pointer. The consumer is then instructed to enter the product serial number for verification purposes. The serial number on higher-end goods is normally provided by the manufacturer on the goods themselves (e.g. on the back of a television set), while a serial number for lower-end goods may be printed inside the packaging by the manufacturer (e.g. for a bar of soap). After verification by the system that the serial number provided by the purchaser has not been previously rebated, the rebate amount is then used to provide immediately a credit to the purchaser's telephone account, which credit will appear on the purchaser's next statement. The telephone service provider accumulates, on a periodic basis, the total amount of rebates it provided for each manufacturer it services, and bills each manufacturer for the total rebated amounts as well as a service charge, which may be incremental (per rebate) or a flat fee.

Advantageously, the consumer obtains a rebate in the form of an electronic credit against his or her telephone account and does not have to wait the usual four to eight weeks to receive a check which, due to its usually small amount, might not even be cashed. The consumer will be more likely to utilize this form of rebate service since it is quick, easy and needs no follow-up (i.e. no cashing of a check). The manufacturer enjoys increased product sales as a result, and should save on costs since the fees charged by the telephone service provider are less than the processing and mailing costs of paper rebate coupons of the prior art.

By implementing the automatic rebate system of the present invention, the existing public telephone network is advantageously used to provide credits to the consumer for his or her existing account rather than inconvenience the consumer with checks of minimal amounts. The rebate service is thus available to virtually every consumer. Moreover, since the rebate system of the present invention does not require merchant intervention, it allows the consumer to make his or her purchase at any desired merchant and still receive the same rebate.

The manufacturer can optionally limit each purchaser's household (defined by the purchaser's telephone account number) to a predetermined number of rebates for a certain product within a predetermined period of time. For example, a manufacturer could restrict the system to only give rebates to any one household (i.e. telephone number account) for one package of light bulbs per month.

As an alternative to the use of the touch-tone telephone keypad for data entry, the rebate system could be configured to accept voice input from the consumer. Appropriate speech recognition technology would then be implemented by the system in order to process the voice input and provide the rebate accordingly.

DESCRIPTION OF THE PREFERRED EMBODIMENT

Figure 1:
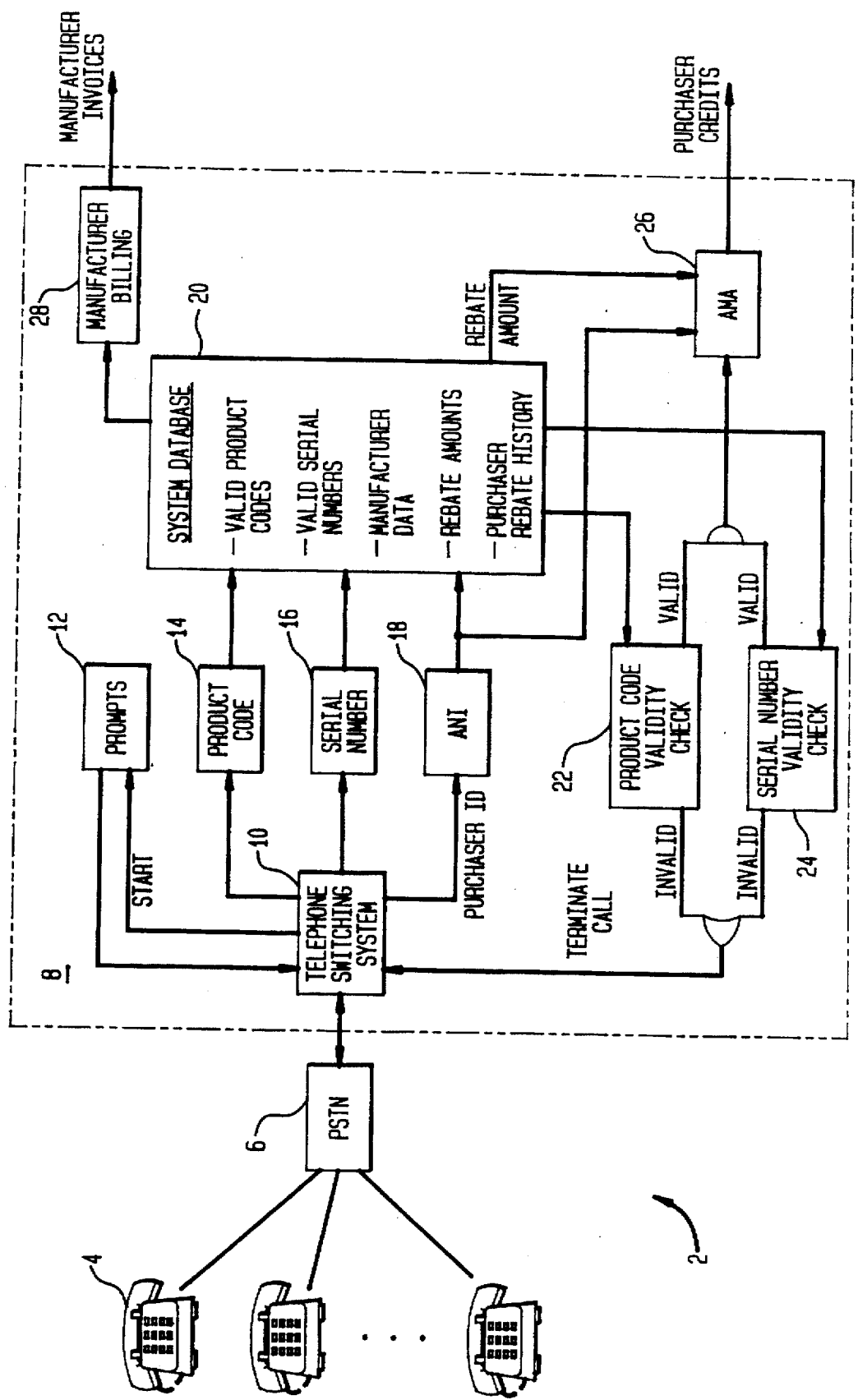
FIG. 1 is a block diagram of the high-level architecture and logic functions of the preferred embodiment of the automatic rebate system of the present invention.
Figure 2:
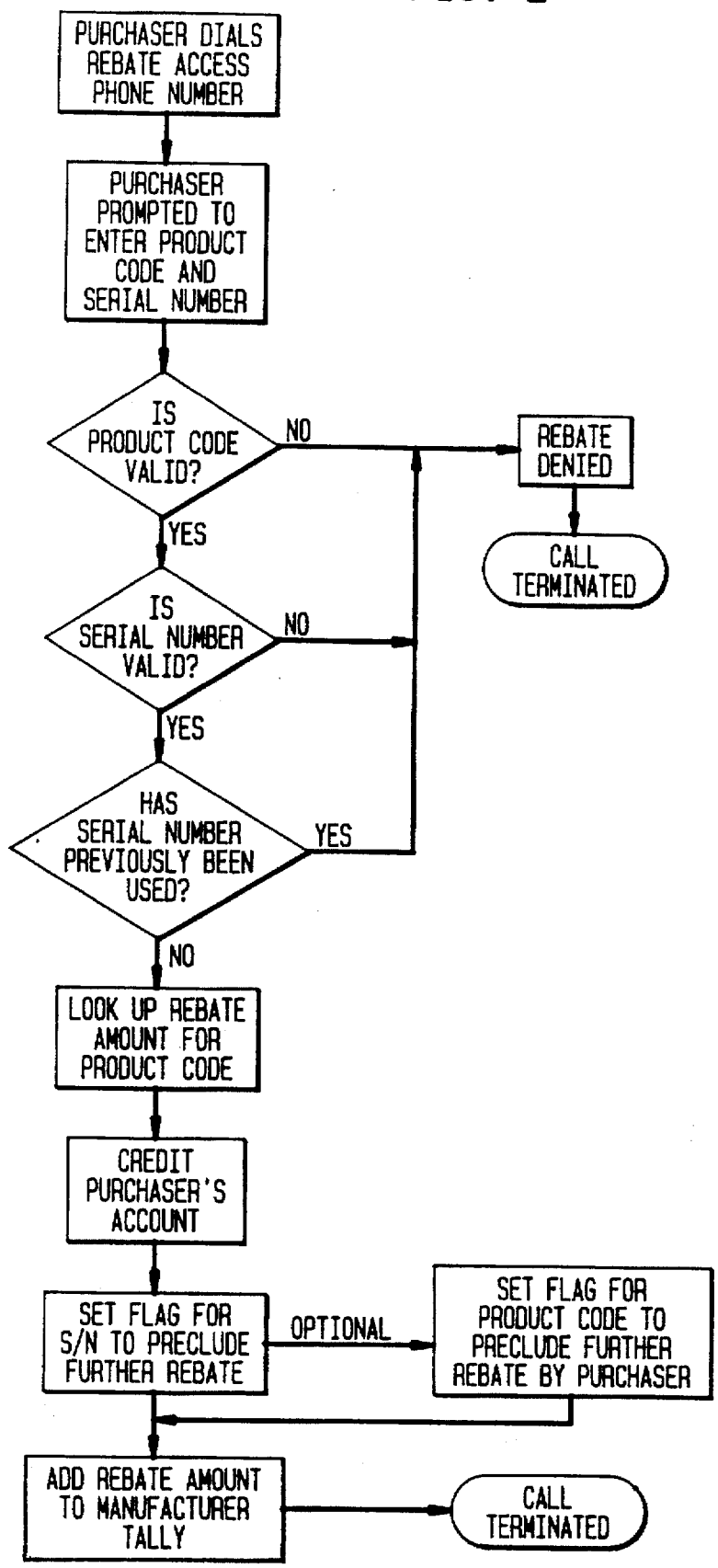
FIG. 2 is a flowchart of the operation of the automatic rebate system of the present invention.

Referring to FIGS. 1 and 2, the general high-level architecture of the rebate system 2 of the preferred embodiment will be described. After purchasing a product with a rebate offered by a manufacturer subscribing to the rebate system 2, the purchaser dials the preassigned telephone number into his home touch-tone telephone 4, thus accessing the rebate platform 8 via the public service telephone network (PSTN) 6. A telephone switching system 10 associated with the rebate platform 8 recognizes the preassigned rebate telephone number and activates the processing of the rebate. In the preferred embodiment, the telephone switching system 10 is an electronic switching system #4 (4ESS), but alternatively may be any appropriate network element such as a speech recognition platform.

The user is prompted via prompt logic 12 to provide a product code and, optionally, a serial number assigned to the product. The product code may be the UPC or some other pre-assigned code for a particular item. The serial number is unique to the particular item purchased, and is used as a security device to prevent repeated rebates for one purchased product. Certain items in commerce are already usually provided with serial numbers (e.g. television sets) while others such as bars of soap will require the packaging to be modified to allow imprinting of a unique serial number somewhere inside. By placing the serial number in a location not easily accessible to a shopper, the likelihood of rebate fraud is minimized since the serial number cannot be accessed until the product is brought home, opened, and possibly used.

The product code and serial number entered by the purchaser via the touch-tone telephone 4 are held in registers 14 and 16, respectively, for validity checks against a database 20 stored in the platform 8. The system 2 may be configured to prompt for the entry of the product code and serial number at the same time, or may prompt for the serial number after the product code has been verified to be valid. The purchaser's automatic number identification (ANI), which is automatically provided by the telephone switching system 10 upon connection of the call, is stored in register 18 as a purchaser ID.

The database 20 is a central repository of all information required by the platform 8 to process the rebates. The database comprises a list of valid product codes and, optionally, sub-lists of valid serial numbers associated with each product code. A rebate amount is also stored for each product code in the database. In addition, manufacturer identification data for each product code is stored to enable the billing of each manufacturer on a periodic basis for every rebate processed by the platform 8.

Optionally, the database can store a history of all or certain rebates allowed to a particular purchaser. This allows the system to be configured so that a certain product can only be rebated a certain number of times by a certain purchaser.

For example, once a purchaser has obtained a rebate for a first bar of Acme soap, he (and anyone using his telephone) may be precluded from obtaining a like rebate on a second bar of Acme soap. This may be a time-triggered mechanism, so that the purchaser can again obtain a rebate on another bar of Acme soap after a predetermined time (e.g. one month) has elapsed.

The validity checks are carried out by logic circuits 22 and 24 using the database 20 and are used as a means to provide security against rebate fraud or to indicate incorrect entry of the product code or serial number by the purchaser. For example, if the product code entered is non-existing, or if the rebate offer for that product has expired, then the rebate is disallowed and the call is terminated. In addition, if the serial number is bogus, or if the serial number has already been rebated, the call is terminated. If, however, the product code and the serial number pass their respective validity checks against the database 20, the rebate is allowed.

Upon allowance of the rebate, the rebate amount is retrieved from the database 20 and input to an automated message accounting (AMA) logic circuit 26. The AMA circuit 26 utilizes the ANI stored in register 18 to credit the purchaser's telephone account with an amount equal to the amount of the rebate.

The amount rebated is then added to the running total stored in the database 20 for the particular manufacturer whose product has just been rebated to the purchaser. On a periodic basis (e.g. every month), the manufacturers are billed via logic circuit 28 for the total amounts rebated for their respective products, in addition to a service charge added by the telephone service provider.

The serial number is flagged in the database to indicate that it has been rebated; future validity checks against the rebated serial number for the rebated product will accordingly not pass. Optionally, the purchaser history portion of the database 20 can be updated to reflect that the purchaser has obtained a rebate on the particular product code so that any limits imposed on the purchaser in the future for the same product can be implemented.

Figure 3:
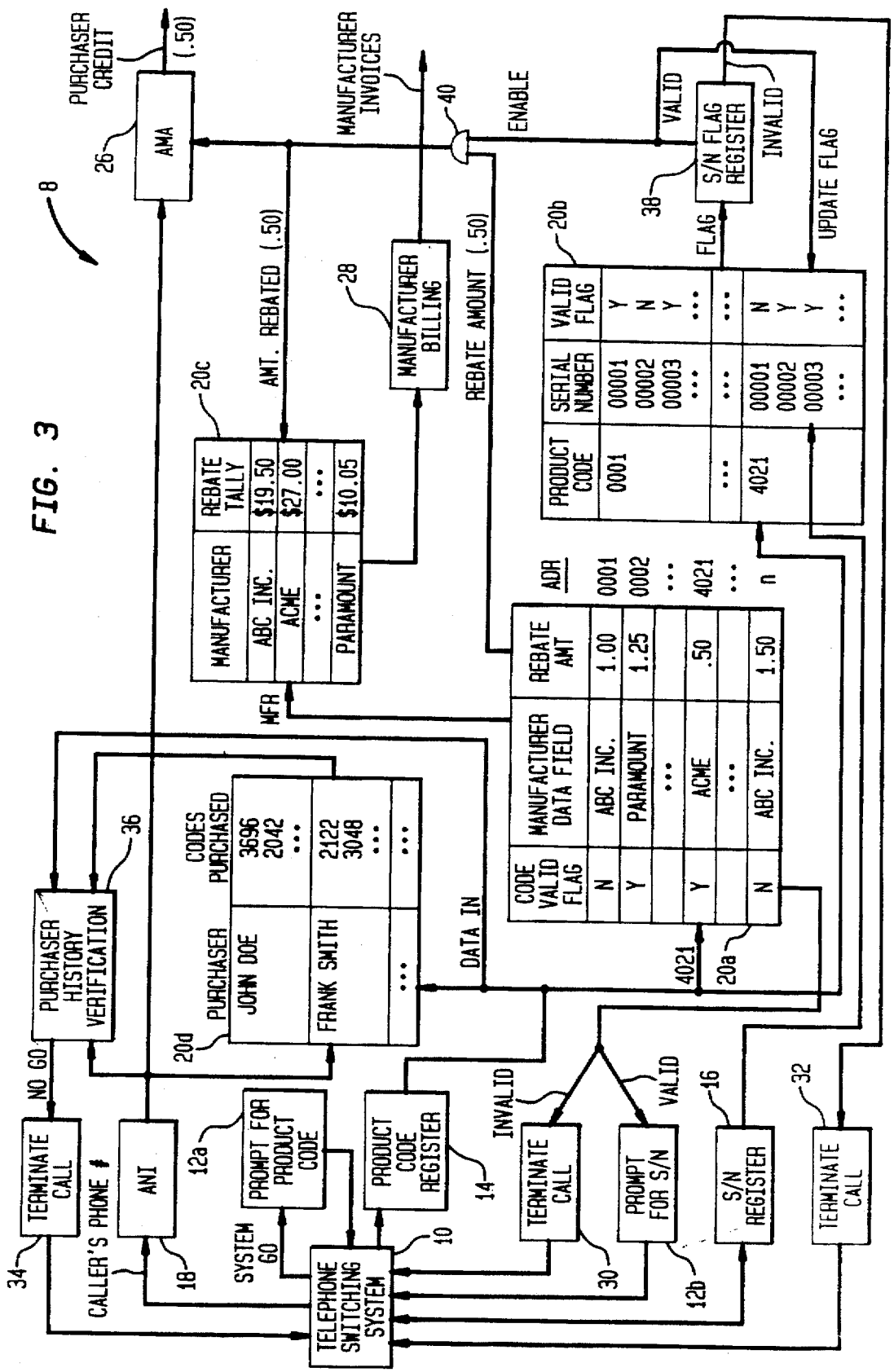
FIG. 3 is a detailed block diagram of the logic functions of the preferred embodiment of the automatic rebate system of the present invention.

The more detailed logical function diagram of the platform 8 shown in FIG. 3 will now be described with reference to a typical working example. In the instances where like functions are illustrated, the same reference numerals are used as in FIG. 1.

The Acme company offers a rebate to purchasers of its 100 watt light bulbs in the amount of 50 cents for every package sold, with no limit of rebates per purchaser household. Acme has assigned product code number 4021 to its 100 watt light bulbs and has printed this number on its packaging. Acme has printed on the inside of its 100 watt light bulb packages a serial number unique to each package, ranging from 00001 to 30000.

After providing the applicable telephone service provider with the above data, Acme advertises to its purchasers that it may collect a 50-cent rebate for each 100 watt light bulb purchased by dialing the number 1-800-REBATES, which the telephone service provider has assigned to all of its rebate offers.

Frank Smith purchases a package of 100 watt light bulbs from an arbitrary merchant, takes the package home, opens it, and determines the product code 4021 and the unique serial number for his purchase, which is 00003. Upon dialing 1-800-REBATES on his touch-tone telephone 4, Smith is connected with the telephone switching system 10 by the PSTN 6. A SYSTEM GO signal is generated at the telephone switching system 10, which initiates a voice prompt at prompt logic 12a instructing Smith to enter his product code. Smith enters product code 4021, which is held in register 14 for further processing.

The product code 4021 is used to address the appropriate field in the database 20a to ascertain (a) if the code is valid, (b) the manufacturer associated with the product code, and (c) the rebate amount for the product code. In this example, product code 4021 indicates a CODE VALID flag, the manufacturer Acme, and the rebate amount of 50 cents.

Since the CODE VALID flag indicates a valid, unexpired product code has been entered by Smith, the prompt logic 12b prompts Smith to enter the unique serial number into his phone keypad. Smith enters 00003, which is held by the serial number register 16 for further processing.

Both the product code 4021 and the serial number 00003 are used to address a portion of the look-up table 20b which contains the SERIAL NUMBER VALID flags for the particular item. Each product code has allocated to it a space in the look-up table for each serial number provided by the manufacturer; in this case, product code 4021 has 30,000 locations allocated.

The SERIAL NUMBER VALID flag in this example is valid, which is held in the serial number flag register 38. The look-up table 20b is then revised to change the flag from valid to invalid, thus precluding Smith (or anyone else) from attempting to collect another rebate for the exact same item. Although the serial numbers in this illustration are sequential, a manufacturer may specify random numbers (or the use of "check digits") in order to eliminate callers from guessing at serial numbers in an attempt to obtain fraudulent rebates.

Optionally, a counter could be implemented to keep track of invalid attempts by any one purchaser and lock him out of the system if a predetermined number of unsuccessful (and thus likely fraudulent) rebate attempts are made.

If the serial number is invalid (e.g. number 54122 is entered) or if it has already been used, then the call is terminated. In this example, the serial number 00003 is valid, and gate 40 is thus enabled for rebate crediting to the purchaser's account.

The rebate amount of 50 cents is retrieved from the look-up table 20a and provided to the AMA logic 26. The AMA logic utilizes the product identification information obtained at call connection via the ANI 18 in order to provide immediately a record of the 50-cent rebate to Frank Smith's telephone account, which will appear on Smith's next phone bill.

The look-up table 20d is then updated to add the product code 4021 to the list of all the product codes for which Smith has obtained a rebate. Each purchaser, through his unique ANI, is allocated a space in this portion of the look-up table in order to track purchaser rebate history.

The manufacturer tally stored for Acme in the look-up table 20c is then updated to indicate that the total amount rebated to all telephone callers for all Acme products is $27.00. At the end of the month, a bill is generated and sent to Acme for the balance, and the tally space is cleared and ready for the next rebate cycle. The telephone service provider will also likely include a service charge with the bill, which may be on a percentage basis or a flat fee.

Although not implemented in the above example, the manufacturer has the option of placing limits on the number of rebates which may be awarded to a given purchaser (defined by the ANI) in a given time. For example, Acme could have instructed the telephone service provider to only give two rebates per month to a particular purchaser of its 100 watt light bulbs, product code 4021. Before the rebate transaction is allowed, the look-up table 20d is accessed by the purchaser history verification logic circuit 36, which utilizes the ANI as an address to retrieve from the look-up table 20d the needed data. The history verification logic 30 checks that the number of rebates for the purchaser has not been exceeded in accordance with the manufacturer's specifications, and allows or disallows the rebate accordingly.

As an alternative to the use of DTMF data entry by the consumer via the touch-tone telephone 4, the rebate system 2 may be configured to accept voice input from the consumer. The consumer is then instructed via a voice prompt at prompt logic 12a to simply read the required information, and the platform 8 is configured with appropriate speech recognition circuitry which is well known in the art.

The preferred embodiment described herein is an illustration of the implementation of the logical functions required in carrying out the present invention. It is not intended that the present invention be limited to the embodiments disclosed, but is capable of numerous rearrangements, modifications and substitutions of parts and elements without departing from the spirit of the invention. For example, a microprocessor based system will perform many of the functions shown in the drawings and disclosed herein, as will discrete logic circuits. Moreover, the rebate system database can be arranged to store the required data in any form convenient to the system designer. Accordingly, the present invention is intended to encompass such rearrangements, modifications and substitutions of parts and elements as fall within the spirit and scope of the appended claims.

I claim:

1. A method for crediting to a purchaser of a manufacturer's product a rebate correlated to the purchase, said method comprising the steps of:
   a) providing to the purchaser a rebate system access telephone number;
   b) upon connection of a telephone call initiated by the purchaser to a telephone station corresponding to the rebate system access telephone number, prompting the purchaser to enter into the system a product code;
   c) accepting the purchaser's input of a product code correlated to the purchased product and storing said product code in a product code register;
   d) verifying the validity of the accepted product code and terminating the call if the product code is invalid, wherein said product code verifying step comprises the steps of:
      i) accessing a first computer data base using said product code as an address, said first computer data base comprising product code valid flag data for determining the propriety of issuing a rebate for a product corresponding to said product code, manufacturer data for identifying the particular manufacturer of the product corresponding to said product code, and rebate data for setting the rebate amount for the product corresponding to said product code; and
      ii) terminating the call when said product code valid flag is false;
   e) prompting the purchaser to enter into the system a serial number unique to the particular product purchased by the purchaser;
   f) accepting the purchaser's input of a serial number and storing said serial number in a serial number register;
   g) verifying the validity of the accepted serial number and that said serial number has not been previously rebated and terminating the call if said serial number is invalid or has been previously rebated,
   wherein said serial number verifying step comprises the steps of:
      i) accessing a second computer data base using said serial number and said product code as an address, said second computer data base comprising serial number valid flag data for verifying that the serial number entered by the purchaser has not been previously rebated; and
      ii) terminating the call when said serial number valid flag is false; and
   h) crediting an account dedicated to the purchaser with the rebate amount corresponding to the product code;
   whereby the purchaser is immediately provided with a rebate in the form of a credit to a dedicated account and the need for merchant participation and paper processing of the rebate is eliminated.

2. The method of claim 1 further comprising the steps of:
   k) collating the total amounts rebated in a predetermined period to all purchasers of products from a particular manufacturer,
   wherein said collating step comprises the steps of:
      i) accessing a third computer data base using said manufacturer data as an address, said third computer data base comprising rebate tally data for each manufacturer; and
      ii) increasing said rebate tally data by said rebate data when said product code and said serial number are verified and the propriety of issuing a rebate has been affirmed; and
   l) billing the manufacturer for the total amounts rebated.

3. The method of claim 1 in which the credited account is the purchaser's telephone account.

4. The method of claim 1 in which said prompting steps are implemented by prerecorded voice instructions.

5. The method of claim 1 in which the accepting steps are implemented by speech recognition means and the purchaser's input of a product code and a serial number is by voice input.

6. The method of claim 1 in which the accepting steps are implemented by dual tone multi frequency decoding means and the purchaser's input of a product code and a serial number is by a touch-tone keypad.

7. The method of claim 1 further comprising the step of:
   j) determining that the credited purchaser has already been rebated for a particular product code so that subsequent attempts by the credited purchaser to rebate the same product code may be denied,
   wherein said rebate determination step comprises the steps of:
      i) accessing a fourth computer data base using an automatic identification number corresponding to a particular purchaser requesting a rebate as an address, said fourth computer data base comprising product code history data corresponding to the product codes previously input into said system to provide to telephone customers a rebate by said purchasers; and
      ii) comparing said product code history data with a proffered product code to determine the propriety of terminating said call.

8. In a public switched telephone network, a system to provide to telephone customers a rebate for the purchase of a manufacturer's product, said rebate being in the form of an electronic credit to the purchaser's telephone account, said system comprising:

a) means to recognize a predetermined rebate access telephone number which has been dialed into the telephone network by the product purchaser;

b) means to prompt the purchaser to enter into the telephone network a product code associated with the purchaser's product;

c) means to verify the validity of the product code entered by the purchaser and terminate the call if the product code is invalid, wherein said product code is used as an address to access information in a first computer data base, said first computer data base comprising product code valid flag data for determining the propriety of issuing a rebate for a product corresponding to said product code, manufacturer data for identifying the particular manufacturer of the product corresponding to said product code, and rebate data for setting the rebate amount for the product corresponding to said product code;

d) means to prompt the purchaser to enter into the telephone network a unique product serial number associated with the purchaser's product;

e) means to verify the validity of the serial number entered by the purchaser and to terminate the call if the serial number is invalid, wherein said serial number and said product code are used as an address to access information in a second computer data base, said second computer data base comprising serial number valid flag data for verifying that the serial number entered by the purchaser has not been previously rebated;

f) means for terminating the call if the serial number has been previously rebated;

g) means to credit the purchaser's telephone account with the rebate amount corresponding to the product code;

whereby the purchaser is immediately provided with a rebate in the form of a credit to his telephone account and the need for merchant participation and paper processing of the rebate is eliminated.

9. The system of claim 8 further comprising:

i) means for collating the total amounts rebated in a predetermined period to all purchasers of products from a particular manufacturer, wherein said manufacturer data is used as an address in a third computer data base, said third computer data base comprising rebate tally data for each manufacturer which is increased by said rebate data when said product code and said serial number are verified and the propriety of issuing a rebate has been affirmed; and j) means for billing the manufacturer for the total amounts rebated.

10. The system of claim 8 in which the credited account is the purchaser's telephone account.

11. The system of claim 8 in which said prompting means are prerecorded voice instructions.

12. The system of claim 8 in which said means to verify the validity of the product code entered by the purchaser and said means to verify the validity of the serial number entered by the purchaser comprise speech recognition means.

13. The system of claim 8 in which said means to verify the validity of the product code entered by the purchaser and said means to verify the validity of the serial number entered by the purchaser comprise dual tone multi frequency decoding means.

14. The system of claim 8 further comprising:

i) means to indicate that the credited purchaser has already been rebated for the particular product code so that subsequent attempts by the credited purchaser to rebate the same product code will be denied, wherein an automatic identification number corresponding to a particular purchaser requesting a rebate is used as an address in a fourth computer data base, said fourth computer data base comprising product code history data corresponding to the product codes previously input into said system to provide to telephone customers a rebate by said purchasers, and wherein said product code history data is compared with a proffered product code to determine the propriety of terminating a call.

* * * * *